(12) United States Patent
Mifsud et al.

(10) Patent No.: US 10,315,531 B2
(45) Date of Patent: Jun. 11, 2019

(54) METHOD AND APPARATUS FOR DISCHARGING A HIGH-VOLTAGE BUS

(71) Applicant: GM GLOBAL TECHNOLOGY OPERATIONS LLC, Detroit, MI (US)

(72) Inventors: David J. Mifsud, Novi, MI (US); Marjorie A. Bassham, Burton, MI (US); Kyle Holihan, South Lyon, MI (US); Emil Francu, Northville, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 348 days.

(21) Appl. No.: 15/284,033

(22) Filed: Oct. 3, 2016

(65) Prior Publication Data

US 2018/0093574 A1 Apr. 5, 2018

(51) Int. Cl.
| | |
|---|---|
| *B60L 1/00* | (2006.01) |
| *B60L 3/00* | (2019.01) |
| *H02G 3/00* | (2006.01) |
| *B60L 50/13* | (2019.01) |
| *B60R 16/02* | (2006.01) |
| *H02M 7/44* | (2006.01) |
| *B60K 1/04* | (2019.01) |

(52) U.S. Cl.
CPC .............. *B60L 50/13* (2019.02); *B60L 1/00* (2013.01); *B60L 3/0023* (2013.01); *B60R 16/02* (2013.01); *H02M 7/44* (2013.01); *B60K 1/04* (2013.01); *Y02T 90/16* (2013.01)

(58) Field of Classification Search
CPC ...... B60L 11/08; B60L 11/18; B60L 11/1803; B60L 3/0023; B60L 3/0038; B60L 3/0046; B60L 3/0084; B60L 3/0092; B60L 11/1809; B60L 50/13; B60L 1/00; Y02T 90/16
See application file for complete search history.

(56) References Cited

U.S. PATENT DOCUMENTS

| | | | | |
|---|---|---|---|---|
| 5,804,973 A | * | 9/1998 | Shinohara | B60L 11/1807 324/537 |
| 2013/0241279 A1 | * | 9/2013 | Schum | B60L 1/02 307/9.1 |
| 2013/0307480 A1 | * | 11/2013 | Boggs | B60L 3/00 320/118 |
| 2016/0243954 A1 | * | 8/2016 | Moro | H02H 7/18 |
| 2016/0339837 A1 | * | 11/2016 | Bolduc | B60Q 1/46 |

* cited by examiner

*Primary Examiner* — Rexford N Barnie
*Assistant Examiner* — Rasem Mourad
(74) *Attorney, Agent, or Firm* — Quinn IP Law

(57) ABSTRACT

An electrical system for a vehicle includes a high-voltage DC power source electrically connected to a high-voltage bus, a first controller disposed to control electric power flow between the high-voltage bus and a first actuator, and a second controller disposed to control electric power flow between the high-voltage bus and a second actuator. A communication link is disposed to effect communication between the first controller and the second controller. An inertial sensor communicates with the second controller. The second controller includes an instruction set to monitor and determine a request to discharge the high-voltage bus based upon communication from the sensor. Upon determining that the first controller is incapable of discharging the high-voltage bus, the second actuator is controlled to discharge the high-voltage bus.

17 Claims, 2 Drawing Sheets

METHOD AND APPARATUS FOR DISCHARGING A HIGH-VOLTAGE BUS

TECHNICAL FIELD

This disclosure relates to electrical energy storage devices employed on vehicles.

BACKGROUND

Electrified vehicles include electric power distribution systems to supply high-voltage and low-voltage electric power to various devices for propulsion and other on-vehicle electric power needs. There are requirements for systems to have a discharge path to discharge high-voltage electric power under certain circumstances.

SUMMARY

An electrical system for a vehicle is described, and includes a high-voltage DC power source electrically connected to a high-voltage bus, a first controller disposed to control electric power flow between the high-voltage bus and a first actuator, and a second controller disposed to control electric power flow between the high-voltage bus and a second actuator. A communication link is disposed to effect communication between the first controller and the second controller. A sensor is disposed to monitor vehicle inertia and communicates directly with the second controller. The second controller includes an instruction set that is executable to monitor and determine a request to discharge the high-voltage bus based upon communication from the sensor. Communication from the first controller is monitored to determine whether the first controller is capable of discharging the high-voltage bus, and upon determining that the first controller is incapable of discharging the high-voltage bus, the second actuator is controlled to discharge the high-voltage bus.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 3-1 and 3-2 schematically illustrate a secondary discharge routine, which may be executed by the second discharge controller to comprehend whether the first discharge controller is capable of discharging the HV bus, and may further execute to effect a discharge the HV bus when it is determined that the first discharge controller is incapable of discharging the HV bus in response to a command, in accordance with the disclosure.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
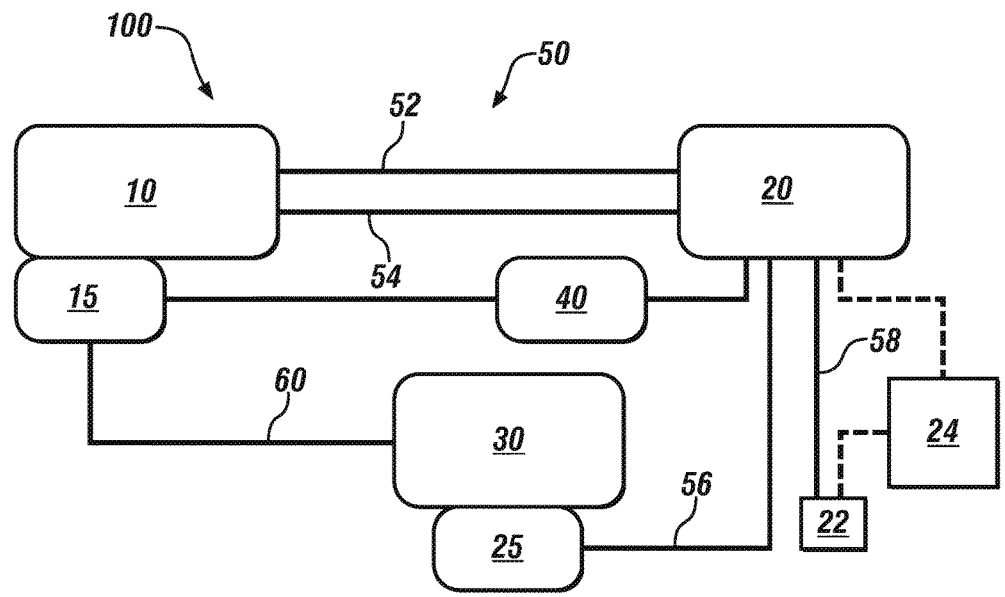
FIG. 1 schematically illustrates an embodiment of an electrical system for a vehicle that includes a high-voltage (HV) electric power bus, a HV DC power source that supplies electric power to a first actuator via a first discharge controller, and a second discharge controller that supplies electric power to a second actuator, in accordance with the disclosure.
Figure 2:
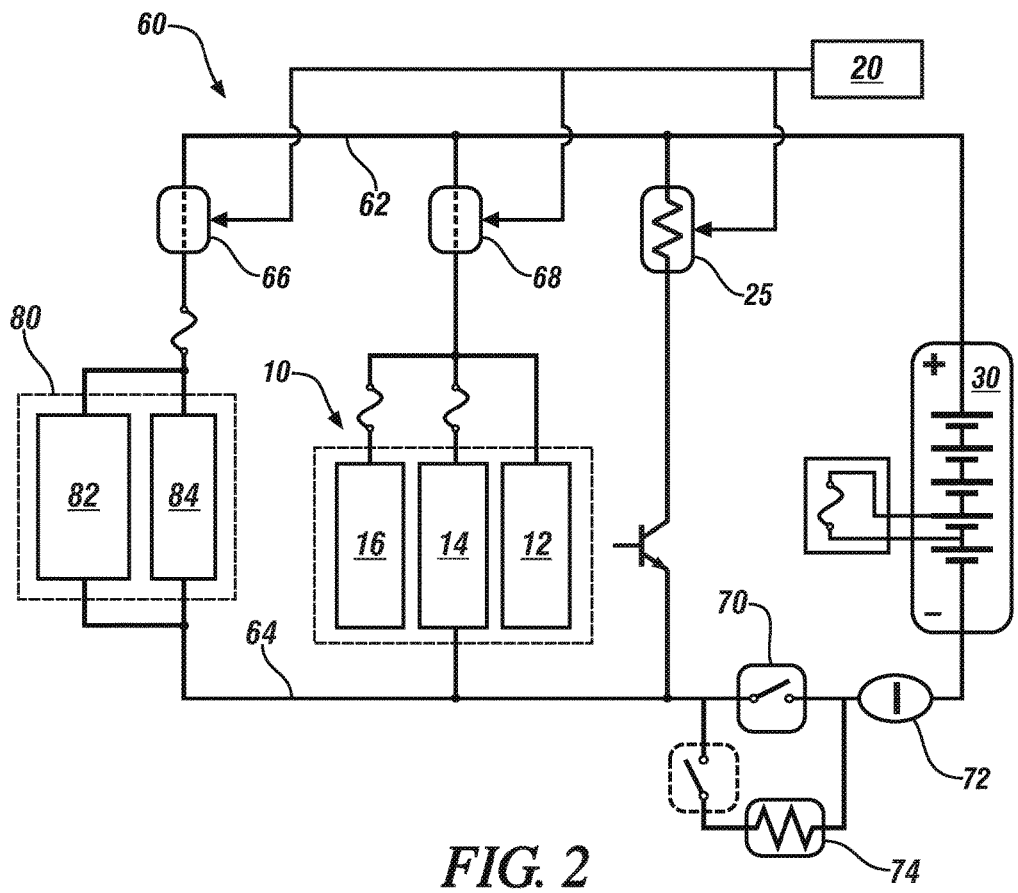
FIG. 2 schematically illustrates additional details of the electrical system described with reference to FIG. 1, including the HV electric power bus, the HV DC power source, the first discharge controller, the second discharge controller and the second actuator, in accordance with the disclosure.

Referring now to the drawings, FIGS. 1 and 2 schematically illustrate an embodiment of an electrical system 100 that may be advantageously employed on a hybrid vehicle, an electric vehicle, or another vehicle system that employs high-voltage electrical power. The vehicle may include, by way of non-limiting examples, a passenger vehicle, a light-duty or heavy-duty truck, a utility vehicle, an agricultural vehicle, an industrial/warehouse vehicle, or a recreational off-road vehicle. The electrical system 100 preferably includes a High-Voltage (HV) bus 60 that is supplied electrical power from a HV DC power source 30, a low-voltage DC power source 40, a first discharge controller 10 and a second discharge controller 20. The first and second discharge controllers 10, 20 communicate via a communication link 50.

The HV DC power source 30 may be any high-voltage electrical energy storage device, e.g., a multi-cell lithium ion device or another suitable device without limitation that employs electrochemical processes to store electrical energy for consumption by operation of the vehicle, and may have a voltage level near 300V DC in certain embodiments. The first discharge controller 10 is operatively connected to a first actuator 15, which receives electric power in a controlled manner to effect work, e.g., torque generation. The second discharge controller 20 is operatively connected to a second actuator 25 via a control link 56. The second actuator 25 may be configured as a HV battery heater that is disposed to supply heat to the HV DC power source 30 in one embodiment. Alternatively, the second actuator 25 may be configured as another device that is capable of consuming high-voltage electrical power. The second discharge controller 20 is in communication with a sensor 22. The sensor 22 may be an inertial sensor, e.g., an accelerometer that is capable of sensing an inertial event such as may be caused by vehicle deceleration. In one embodiment, the sensor 22 may be disposed to monitor absolute acceleration over a range between 0 g and 50 g. The sensor 22 communicates directly to an input port of the second discharge controller 20, with such direct communication effected via a wired link 58, a wireless link (not shown) or another suitable communication link. The sensor 22 may communicate directly with the second discharge controller 20 via the wired link 58, and may also communicate via a sensor controller 24 that directly communicates with the second discharge controller 20. As employed herein, "direct communication" and variants thereof refer to any communication of a signal to a device that does not include an intervening analog/digital conversion and formation of a message that is sent in a structured form via a communication bus to the device. The low-voltage DC power source 40 supplies electric power for operation of controllers, sensors and ancillary devices. The communication link 50 may be any suitable communication link, and in one embodiment includes a first communication link 52 and a second communication link 54, wherein the first and second communication links 52, 54 are networked communication bus links, e.g., controller-area network (CAN) buses that execute message-based protocols to effect communication.

FIG. 2 schematically illustrates additional details of the electrical system 100 described with reference to FIG. 1, including the HV DC power source 30, the first discharge controller 10, and the second actuator 25 in relation to the HV bus 60, and the second discharge controller 20. The HV bus 60 may include a positive high-voltage rail (HV+) 62 and a negative high-voltage rail (HV−) 64. The HV− 64 preferably includes a current sensor 72, a negative contactor switch 70 and a pre-charge contactor circuit 74. A voltage sensor (not shown) may be arranged to monitor the voltage level across HV+ 62 and HV− 64.

A charger controller 80 may be arranged between HV+ 62 and HV− 64, with a first contact switch 66 disposed in series, in one embodiment. The charger controller 80 preferably includes an on-board charging module 82 for managing remote electrical charging and an auxiliary power module 84 for converting high-voltage DC electric power to low-voltage DC electric power for use in the vehicle e.g., at a regulated 12 V DC voltage level. The auxiliary power module 84 may employ switched-mode DC/DC conversion technology, magnetic DC/DC conversion technology, linear DC/DC conversion technology, or another suitable DC/DC conversion technology.

The first discharge controller 10 is disposed between HV+ 62 and HV− 64, with a second contact switch 68 disposed in series. The first discharge controller 10 may be configured to include a power inverter module 12, an electric air conditioning module 14 and an electric cabin heater module 16 in one embodiment. The second actuator 25 is also arranged between HV+ 62 and HV− 64. The first and second contact switches 66, 68 and the second actuator 25 are in communication with the second discharge controller 20, which controls their activation, including as described with reference to FIGS. 3 and 4.

The power inverter module 12 preferably includes suitable control circuits and power transistors e.g., IGBTs, and is electrically connected to the first actuator 15, which may be an electric motor/generator in one embodiment. The control circuits generate pulsewidth-modulating (PWM) control signals that are communicated to the power transistors. The power inverter module 12 controls the power transistors to transform high-voltage DC electric power to high-voltage AC electric power, and also transform high-voltage AC electric power to high-voltage DC electric power in response to the PWM control signals. The high-voltage AC power may be transferred to the first actuator 15 to generate mechanical power for vehicle propulsion in certain embodiments.

As employed herein, the term 'link' refers to electrical wire cables, fabricated from copper, aluminum, or another suitable material, that is of sufficient diameter or cross-sectional area to convey electric power.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, e.g., first and second communication links 52 and 54, a wireless link or any another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers.

Figures 1, 3:
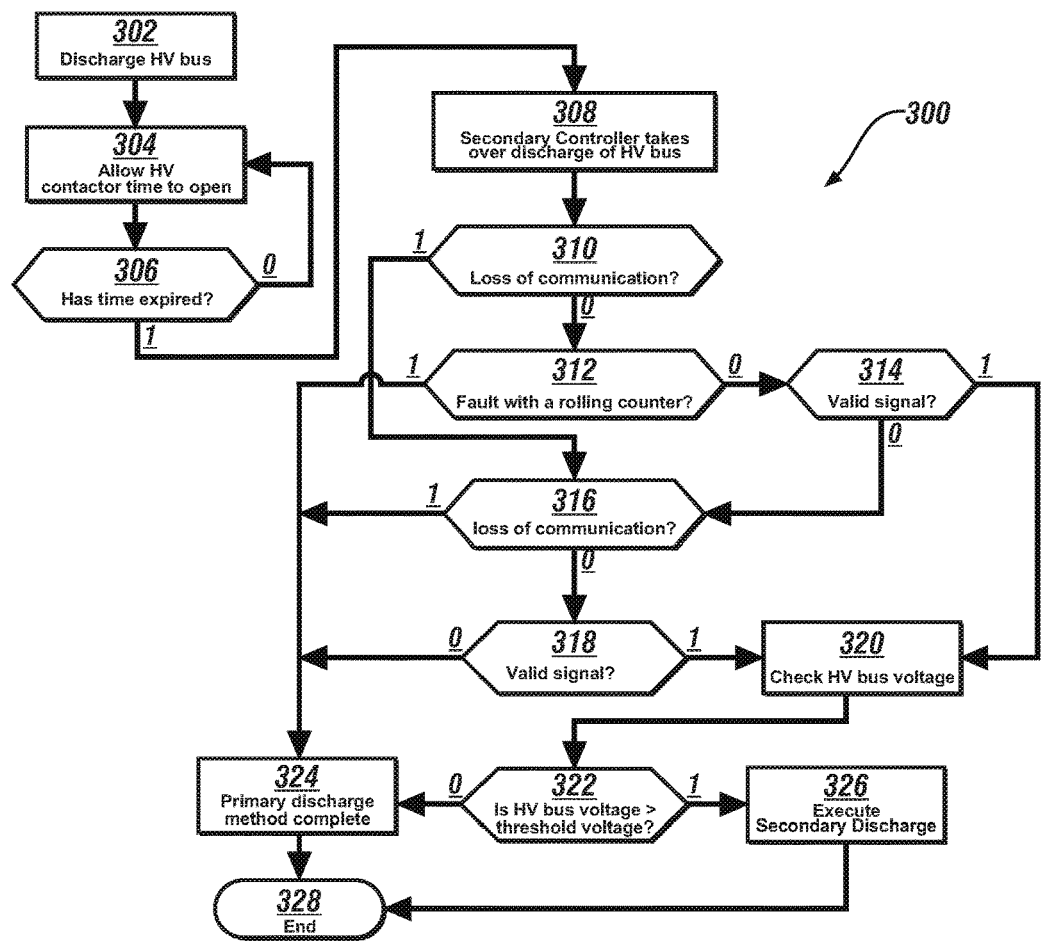
Figures 2, 3:
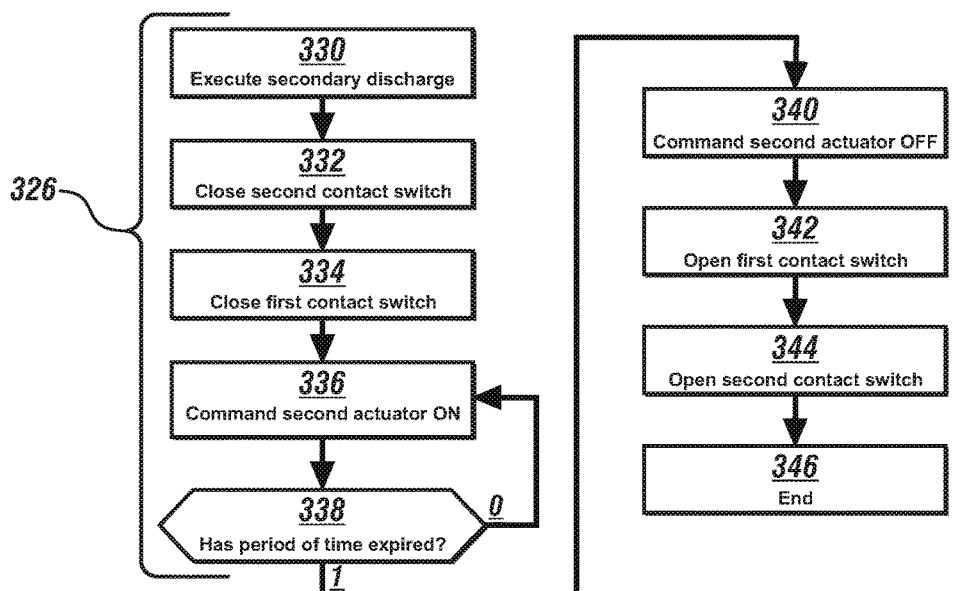

FIGS. 3-1 and 3-2 schematically show an embodiment of a secondary discharge routine 300, which may reside in and be executed as an instruction set by the second discharge controller 20 to comprehend whether the first discharge controller 10 is capable of discharging the HV bus 60 in response to a discharge request, e.g., a signal input from the sensor 22. The secondary discharge routine 300 further executes to effect a discharge of the HV bus 60 in response to the discharge request when it is determined that the first discharge controller 10 is incapable of discharging the HV bus 60 in response to the discharge request. Tables 1 and 2 are provided as keys wherein the numerically labeled blocks and the corresponding executable steps are set forth as follows, corresponding to the secondary discharge routine 300.

TABLE 1

| BLOCK | BLOCK CONTENTS |
|---|---|
| 302 | Request to discharge HV bus indicated |
| 304 | Allow HV contactor a period of time to open |
| 306 | Has time expired? |
| 308 | Secondary Controller takes over discharge of HV bus |
| 310 | Is there a loss of communication on the first communication link? |
| 312 | Is there a fault with a rolling counter? |
| 314 | Is the signal valid on the first communication link? |
| 316 | Is there a loss of communication on the second communication link? |

TABLE 1-continued

| BLOCK | BLOCK CONTENTS |
|---|---|
| 318 | Is the signal valid on the second communication link? |
| 320 | Check HV bus voltage |
| 322 | Is HV bus voltage greater than a threshold voltage? |
| 324 | Determine that primary discharge method is complete |
| 326 | Execute Secondary Discharge |
| 328 | End this portion |

The secondary discharge routine 300 is preferably only initiated when there is a signal indicating a request to discharge the HV bus 60, such as may be indicated by the sensor 22 (302). The sensor 22 may be an inertial sensor or another device that is capable of sensing an inertial event such as may be caused by sudden vehicle deceleration. Overall, this portion of the secondary discharge routine 300 executes to determine whether the first discharge controller 10 is capable of discharging the HV bus 60, or alternatively, determine whether the first discharge controller 10 is incapable of discharging the HV bus 60 due to either a hardware fault or a communication fault, wherein a communication fault may be due to unavailability of communication, corrupted communication, or invalid communication signals. In one scenario, the communication may be functional, but a hardware fault may preclude execution of a control routine to discharge the HV bus 60. In response to the signal indicating a request to discharge the HV bus 60, a period of time is permitted to allow the HV contactor to open via a primary discharge process, which may be executed in the first discharge controller 10 (304)(0). When the period of time has expired without the HV contactor opening via the primary discharge process (304)(1), the secondary discharge controller 20 takes responsibility for effecting the discharge of the HV bus 60 (308).

The secondary discharge controller 20 evaluates communication on the first communication link 52 via steps 310, 312 and 314, and evaluates communication on the second communication link 52 via steps 316 and 318. Error detection on communication links may be provided by communication controllers that are resident of the first and second discharge controllers 10, 20, and is known to those skilled in the art.

Evaluating communication on the first communication link 52 includes determining if there has been a loss of communication on the first communication link 52 (310) and determining if the signal on the first communication link 52 is valid (314), which includes monitoring a rolling counter to determine if signals are being periodically communicated on the first communication link 52 (312). When the rolling counter indicates that signals are not being periodically communicated (312)(0), the secondary discharge 330 is commanded (326). When there has been a loss of communication on the first communication link 52 (310)(1), or when the signal on the first communication link 52 is invalid (314)(0), communication on the second communication link 54 is evaluated via steps 316 and 318. Evaluating communication on the second communication link 54 includes determining if there has been a loss of communication on the second communication link 54 (316) and determining if the signal on the second communication link 54 is valid (318). When there has been a loss of communication on the second communication link 54 (316)(1), or if the signal on the second communication link 52 is invalid (318)(0), the secondary discharge 330 is commanded (326).

When there is communication on the first communication link 52 (310)(0), the active rolling counter is valid (312)(0), and the first communication link 52 is valid (314)(1), or, when there is communication on the second communication link 54 (316)(0) and the second communication link 54 is valid (318)(1), the voltage level on the high-voltage bus 60 is evaluated (320) to determine if it is less than a threshold voltage that indicates it has discharged (322). If not (322)(0), the discharge of the HV bus 60 has occurred (324) and the secondary discharge routine 300 ends without further action (328).

The secondary discharge 330 is described with reference to FIG. 3-2, wherein Table 2 is provided as a key wherein the numerically labeled blocks and the corresponding functions are set forth as follows.

TABLE 2

| BLOCK | BLOCK CONTENTS |
|---|---|
| 330 | Execute secondary discharge |
| 332 | Close second contact switch |
| 334 | Close first contact switch |
| 336 | Command second actuator ON for period of time |
| 338 | Has period of time expired? |
| 340 | Command second actuator OFF |
| 342 | Open first contact switch |
| 344 | Open second contact switch |
| 346 | End |

Overall, this portion of the secondary discharge routine 300 executes to discharge the HV bus 60 when it is determined that the first discharge controller 10 is incapable of discharging the HV bus 60.

Executing the secondary discharge 330 includes a multi-step process for activating contact switches and operating an electric power consuming device that is capable of consuming electric power that is stored on the HV bus 60, e.g., the second actuator 25. The electric power that is stored on the HV bus 60 may include electric power that may be stored on a capacitor that is an element of any one or more of the power inverter module 12, the electric air conditioning module 14, the electric cabin heater module 16, the on-board charging module 82 or the auxiliary power module 84, by way of example. The secondary discharge 330 is described with reference to the electrical system 100 described herein, but the concepts may be applied on other systems that have related mechanizations.

In operation, executing the secondary discharge 330 includes closing the second contactor switch 68 to electrically connect the first discharge controller 10 across the HV bus 60 (332), and then closing the first contactor switch 66 to electrically connect the second discharge controller 20 across the HV bus 60 (334). The second actuator 25 is activated (336) for a time period (338), which may be in the order of magnitude of one to two seconds. When the time period expires (338)(1), The second actuator 25 is deactivated (340), the first contactor switch 66 is opened (342) and the second contactor switch 68 is opened (344), and execution of the secondary discharge 330 ends (346).

As such, the second discharge controller 20 is capable of discharging the HV bus 60 when it determines that the first discharge controller 10 is incapable of such action. This includes closing either or both the first contactor switch 66 and the second contactor switch 68 such that one leg of the HV bus 60 is connected to the second actuator 25, which can be commanded to an ON state to discharge the HV bus 60 within a specified period of time. This may reduce the need for additional component protection hardware on the first discharge controller 10. This system operates under circumstances that may include a disconnection of the low-voltage DC power source 40.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An electrical system for a vehicle, comprising:
   a high-voltage DC power source electrically connected to a high-voltage bus;
   a first controller disposed to control electric power flow between the high-voltage bus and a first actuator;
   a second controller disposed to control electric power flow between the high-voltage bus and a second actuator, wherein the second controller is operatively connected to a first contactor and a second contactor, wherein the first contactor is disposed between a charger device and a positive rail of the high-voltage bus, and wherein the second contactor is disposed between the first controller and the positive rail of the high-voltage bus;
   a communication link disposed to effect communication between the first controller and the second controller;
   a sensor configured to monitor vehicle inertia, wherein the sensor is disposed to communicate directly with the second controller; and
   an instruction set disposed in the second controller, the instruction set executable to:
   monitor communication from the sensor,
   determine a request to discharge the high-voltage bus based upon the communication from the sensor,
   monitor communication from the first controller to determine whether the first controller is capable of discharging the high-voltage bus,
   close the first contactor and then close the second contactor prior to controlling the second actuator to discharge the high-voltage bus, and
   control the second actuator to discharge the high-voltage bus upon determining that the first controller is incapable of discharging the high-voltage bus.

2. The electrical system of claim 1, further comprising the instruction set executable to open the second contactor and then open the first contactor subsequent to controlling the second actuator to discharge the high-voltage bus.

3. The electrical system of claim 1, wherein the first controller comprises an inverter module and the first actuator comprises a motor/generator.

4. The electrical system of claim 1, wherein the second actuator comprises a high-voltage battery heater.

5. The electrical system of claim 1, wherein the instruction set executable to monitor communication from the first controller to determine whether the first controller is capable of discharging the high-voltage bus comprises the instruction set executable to monitor signal communication on the communication link.

6. The electrical system of claim 1, wherein the instruction set executable to determine that the first controller is incapable of discharging the high-voltage bus comprises the first instruction set executable to detect a communication fault.

7. The electrical system of claim 1, wherein the communication link disposed to effect communication between the first controller and the second controller comprises first and second controller-area network buses that execute message-based protocols to effect communication.

8. The electrical system of claim 1, further comprising the high-voltage bus including a positive rail and a negative rail, wherein the negative rail includes a controllable contactor switch disposed between the negative rail and the high-voltage DC power source.

9. A method for controlling an electrical system for a vehicle, wherein the electrical system includes a high-voltage DC power source electrically connected to a high-voltage bus, a first controller disposed to control electric power flow between the high-voltage bus and a first actuator, a second controller disposed to control electric power flow between the high-voltage bus and a second actuator, wherein the second controller is operatively connected to a first contactor and a second contactor, wherein the first contactor is disposed between a charger device and a positive rail of the high-voltage bus, and wherein the second contactor is disposed between the first controller and the positive rail of the high-voltage bus, a communication link disposed to effect communication between the first controller and the second controller, and a sensor disposed to monitor vehicle inertia, wherein the sensor is disposed to communicate with the second controller, the method comprising:
   monitoring communication from the sensor;
   determining a request to discharge the high-voltage bus based upon a communication from the sensor indicating an inertial event;
   monitoring communication from the first controller to determine whether the first controller is capable of discharging the high-voltage bus; and
   closing, via the second controller, the first contactor and then closing the second contactor prior to controlling the second actuator to discharge the high-voltage bus,
   controlling, via the second controller, the second actuator to discharge the high-voltage bus upon determining that the first controller is incapable of discharging the high-voltage bus.

10. The method of claim 9, further comprising opening the second contactor and opening the first contactor subsequent to controlling the second actuator to discharge the high-voltage bus.

11. The method of claim 9, wherein monitoring communication from the first controller to determine whether the first controller is capable of discharging the high-voltage bus comprises monitoring signal communication on the communication link.

12. The method of claim 9, wherein determining that the first controller is incapable of discharging the high-voltage bus comprises detecting a communication fault.

13. An electrical system for supplying high-voltage electric power to an inverter module that is electrically connected to a motor/generator for a vehicle, comprising:
a high-voltage bus electrically connected to the inverter module;
a first controller disposed to control electric power flow between the high-voltage bus and the motor/generator;
a second controller disposed to control electric power flow between the high-voltage bus and a second actuator;
the second controller operatively connected to a first contactor and a second contactor;
the first contactor disposed between a charger device and a positive rail of the high-voltage bus; and
the second contactor disposed between the first controller and the positive rail of the high-voltage bus;
a communication link disposed to effect communication between the first controller and the second controller; and
a sensor disposed to monitor vehicle inertia, wherein the sensor is disposed to communicate with the second controller;
wherein the second controller includes an instruction set executable to:
monitor communication from the sensor,
determine a request to discharge the high-voltage bus based upon the communication from the sensor,
monitor communication from the first controller to determine whether the first controller is capable of discharging the high-voltage bus,
close the first and second contactors prior to controlling the second actuator to discharge the high-voltage bus, and
control the second actuator to discharge the high-voltage bus upon determining that the first controller is incapable of discharging the high-voltage bus.

14. The electrical system of claim 13, further comprising the instruction set executable to open the second contactor and then open the first contactor subsequent to controlling the second actuator to discharge the high-voltage bus.

15. The electrical system of claim 14, wherein the second actuator comprises a high-voltage battery heater.

16. The electrical system of claim 13, wherein the instruction set executable to determine that the first controller is incapable of discharging the high-voltage bus comprises the first instruction set executable to detect a communication fault.

17. The electrical system of claim 13, wherein the communication link disposed to effect communication between the first controller and the second controller comprises first and second controller-area network buses that execute message-based protocols to effect communication.

\* \* \* \* \*